(12) United States Patent
Szabo et al.

(10) Patent No.: US 6,991,445 B2
(45) Date of Patent: Jan. 31, 2006

(54) SIDING PRODUCTION LINE COOLING APPARATUS AND METHOD

(75) Inventors: Robert Szabo, Kansas City, MO (US); Garfield Stovin, Kansas City, MO (US); Stevan Miner, Kansas City, MO (US)

(73) Assignee: K-Ter Imagineering, Inc., Kansas City, MO (US)

( * ) Notice: Subject to any disclaimer, the term of this patent is extended or adjusted under 35 U.S.C. 154(b) by 299 days.

(21) Appl. No.: 10/371,318

(22) Filed: Feb. 21, 2003

(65) Prior Publication Data

US 2004/0164447 A1    Aug. 26, 2004

(51) Int. Cl.
   *B29C 47/20*   (2006.01)
(52) U.S. Cl. ............... 425/71; 425/377; 425/378.1
(58) Field of Classification Search ........... 425/71, 425/377, 378.1
   See application file for complete search history.

(56) References Cited

U.S. PATENT DOCUMENTS

| | | | | |
|---|---|---|---|---|
| 2,309,755 A | * | 2/1943 | Davis | 425/140 |
| 2,638,628 A | * | 5/1953 | Stott et al. | 425/71 |
| 3,661,482 A | * | 5/1972 | Brown, Jr. | 425/66 |
| 3,886,250 A | | 5/1975 | Danko | 264/177 R |
| 4,110,062 A | | 8/1978 | Summers | 425/71 |
| 4,247,506 A | | 1/1981 | Summers | 264/177 R |
| 4,446,089 A | * | 5/1984 | Strehler et al. | 264/178 F |
| 4,649,008 A | | 3/1987 | Johnstone et al. | 264/177.1 |
| 4,788,088 A | | 11/1988 | Kohl | 428/34.5 |
| 5,387,381 A | | 2/1995 | Saloom | 264/75 |
| 5,578,328 A | | 11/1996 | Groeblacher | 425/71 |
| 5,869,176 A | | 2/1999 | Dorchester et al. | 428/327 |
| 6,161,354 A | | 12/2000 | Gilbert et al. | 52/520 |
| 6,319,456 B1 | | 11/2001 | Gilbert et al. | 264/519 |

* cited by examiner

*Primary Examiner*—Joseph S. Del Sole
(74) *Attorney, Agent, or Firm*—Wm. Bruce Day

(57) ABSTRACT

A production line for the manufacture of strips of vinyl siding comprises an extruder extruding a strip of hot plastic material, such as vinyl. Next, an embosser supplies a decorative pattern to the heated strip. A cooling apparatus receives the heated strip and immerses the strip in a water bath to lower the temperature to a selected temperature range. The material, now reduced in temperature, is then passed to a former having dies creating joining runs in the cooled, embossed siding strip. Finally the strip runs through a final cooling tank which chills the strip to harden the joining runs created by the former. The cooling apparatus consists of a water bath tank with entry and exit guides for the strip, which are mounted above the level of the water in the water bath tank. A third guide, such as a roller, is positioned between the entry and exit guides and is selectively extendable in depth into the water bath so as to selectively extend the strip deeper into the water bath and thereby vary the dwell time of the strip to regulate cooling.

3 Claims, 4 Drawing Sheets

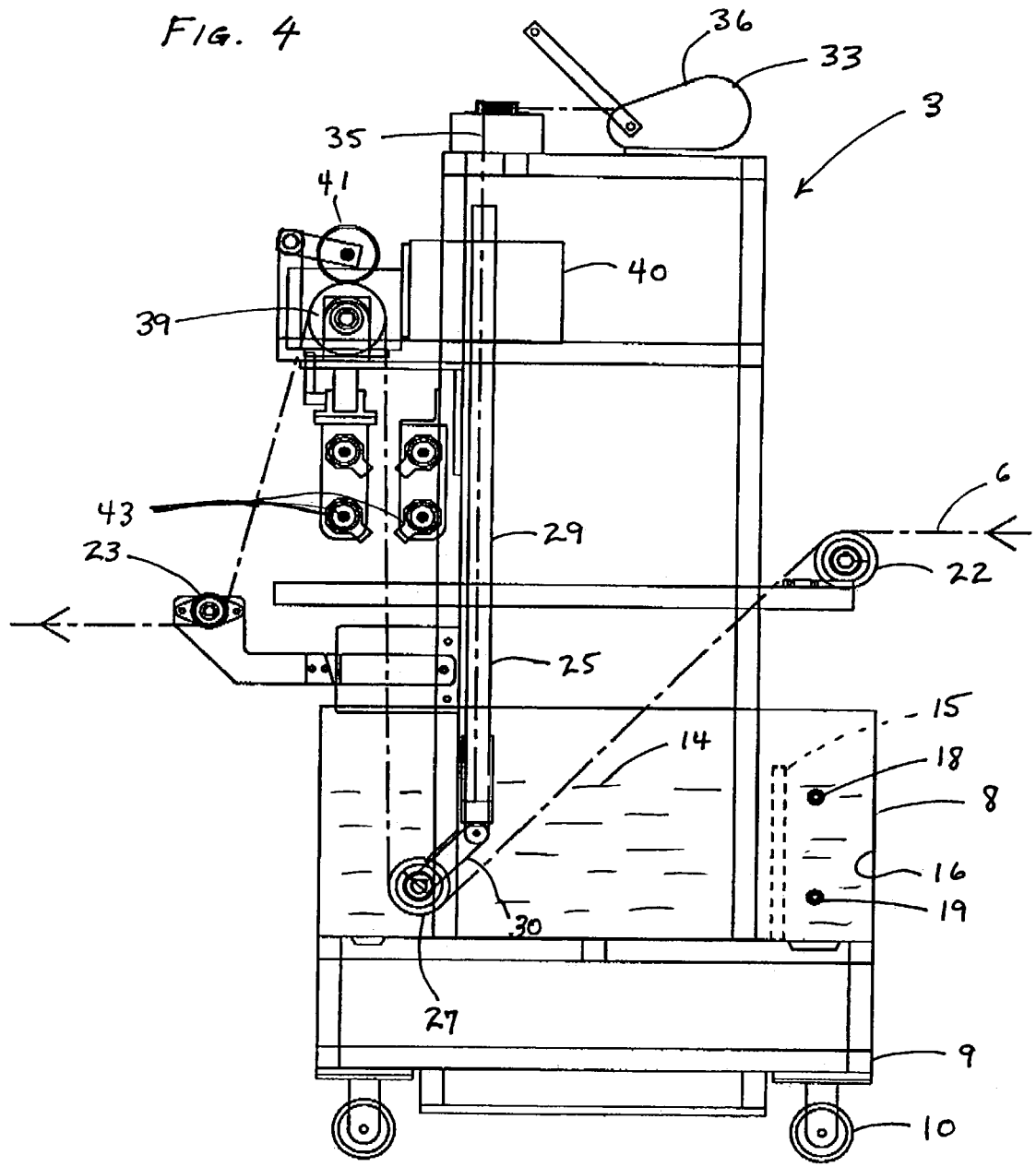

SIDING PRODUCTION LINE COOLING APPARATUS AND METHOD

FIELD OF THE INVENTION

This invention relates to production of extruded plastic articles in a continuous production line, and particularly to a production of strips of so-called vinyl siding.

BACKGROUND OF THE INVENTION

Plastic siding, commonly called vinyl siding, is manufactured in a production line including extruding, embossing, and forming means. When vinyl siding first became popular, the exterior surface was not embossed, but presently, most vinyl siding today is embossed with a roller die in a wood-grain pattern to simulate the look of actual wood. Additionally, edges of the vinyl siding, typically what will become the upper edge when the vinyl siding is mounted on the exterior wall of a house, includes a complex multiple angle bend which provides a nailing or hanging run or strip to secure the length of vinyl siding to the support wall. When the vinyl strip first emerges from the extruding die, the material is quite hot, generally in the temperature range of approximately 380°–410° F. While the material can be embossed and the resultant grain pattern definition maintained at this temperature, the material is too hot to be run through the forming dies. At such temperature, strips run through the forming dies to create hanging strips, or other such runs to secure the length of siding to a wall, remain overly pliable so that the form created by the die does not remain in sharp definition but warps or flattens so that the securing run is insufficiently distinct. Although cooling tanks have often been placed immediately downstream of the forming dies, at approximately 350° F. after embossing, the material tends to jam in the forming dies as it is too hot and too pliable to be satisfactorily formed. Therefore, the vinyl siding industry has long recognized that the material must be cooled between the embossing die and the forming die. To this end, the industry has used cooling rollers, such as shown in FIG. 1. FIG. 1 shows a typical installation wherein the production line, moving from right to left, comprises an extruder, an embosser for a surface pattern, cooling rolls to reduce the temperature of the vinyl strip sufficiently so that it can be run through the forming dies, then lastly through a cooling tank. Typically thereafter, the strip is cut to selected lengths, boxed and shipped. The cooling rolls have tended to be the major weakness in the production line. These need to reduce the temperature of the vinyl strip material as it comes from the embosser, generally at 350° F., to where it enters the forming dies at approximately 250° F. The cooling rolls are hollow aluminum cylinders through which a bath of cooling water circulates. With line speeds initially used in the vinyl siding industry, 8-inch diameter rolls were employed, then as line speeds increased, 10-inch rolls, then 12, then 14, and now 16-inch rolls. For even greater line speeds, a double section of 16-inch cooling rolls are often used, making a total of 4 cooling rollers. It is difficult to regulate temperature of the cooling rolls, as their diameter is established, and control is done only by attempting to regulate water temperature and volume. The cooling roll problem has been the restraint in increasing line speeds to that desired by the industry.

SUMMARY OF THE INVENTION

The present invention provides a cooling apparatus which is used in the vinyl siding production line in place of the cooling roll apparatus. The invention is a water bath tank in which the dwell time of the vinyl siding in the water bath can be selectively controlled independent of the production line speed. To accomplish this, the cooling apparatus is designed with entry and exit guides, such as rollers, which are above the level of coolant, such as water, in the bath tank. An immersion roller is mounted on a mechanism which allows adjustment of the roller downwardly into the water tank at selected levels. The immersion roller pushes down on the traveling strip and the further the roller is down into the water bath, the more time the strip is in cooling contact with the water. After the immersion roll, the strip travels upwardly to a drive roller and then downwardly again to an exit roller from where the strip travels to the forming dies. Air blowers can be mounted between the immersion roll and the drive roll to blow or cut excess water from the water bath. Temperature can be controlled in the water bath by a system of chillers and recirculating pumps. Use of this system can provide a significantly increased line speed over that of the previous cooling rolls or double cooling roll set-up, and is intended to result in greater operating efficiencies for siding manufacturers.

OBJECTS OF THE INVENTION

The objects of the present invention are:
1. to provide a cooling apparatus for a production line for the manufacture of strips of vinyl siding;
2. to provide such a cooling apparatus, including a water bath;
3. to provide such a cooling apparatus in which the dwell time of the vinyl strip can be varied and regulated without directly effecting the production line speed;
4. to provide such a cooling apparatus providing a water lubrication to the surface of the strip for benefit in running the material through forming dies; and
5. to provide such a cooling apparatus which is ideally suited for the intended purpose, efficient in use, and enables high rates of line speed in the production process.

Other objects and advantages of the invention will become apparent from the following description, taken in connection with the drawings.

BRIEF DESCRIPTION OF THE DRAWINGS

FIG. 4 is a side elevation view of the cooling apparatus showing the adjustment mechanism lowered to a full down position.

DESCRIPTION OF THE PREFERRED EMBODIMENT

As required by the statutes and case law, a detailed embodiment of the present invention is disclosed herein. It is, however, to be understood that the enclosed embodiment is merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
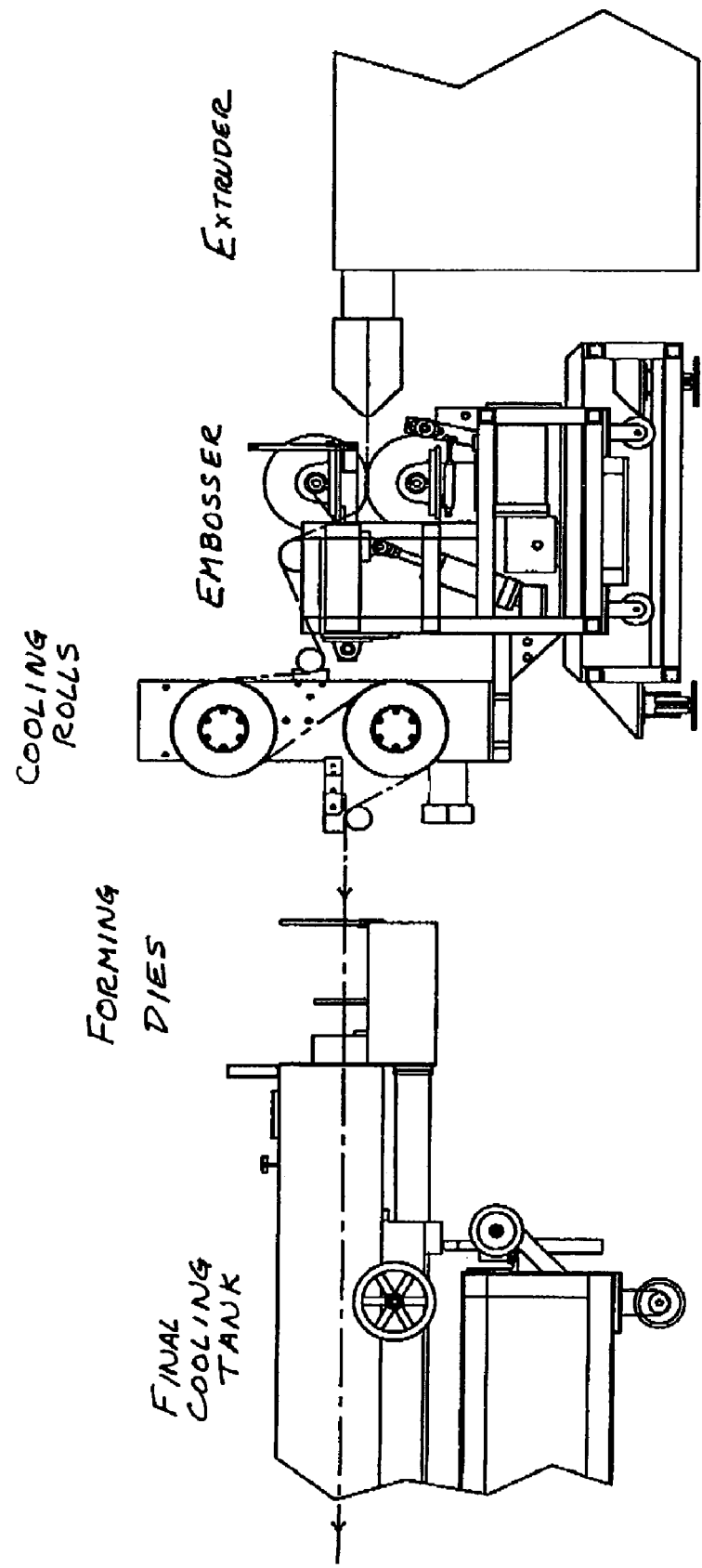
FIG. 1 is a generalized view of a prior art production line for the manufacture of strips of vinyl siding.

FIG. 1 illustrates the prior art and is representative of a production line in which an extruded vinyl strip first emerges from the extruder, then to an embosser for impressing a pattern, such as a wood grain pattern on the strip, then to cooling rolls, then to a forming die which is intending to create an attachment run, such as a nailing strip, in the siding strip, and then, lastly, to a final cooling tank where the attachment run is set and the material chilled sufficiently for cutting to selected lengths and packaging.

Figure 2:
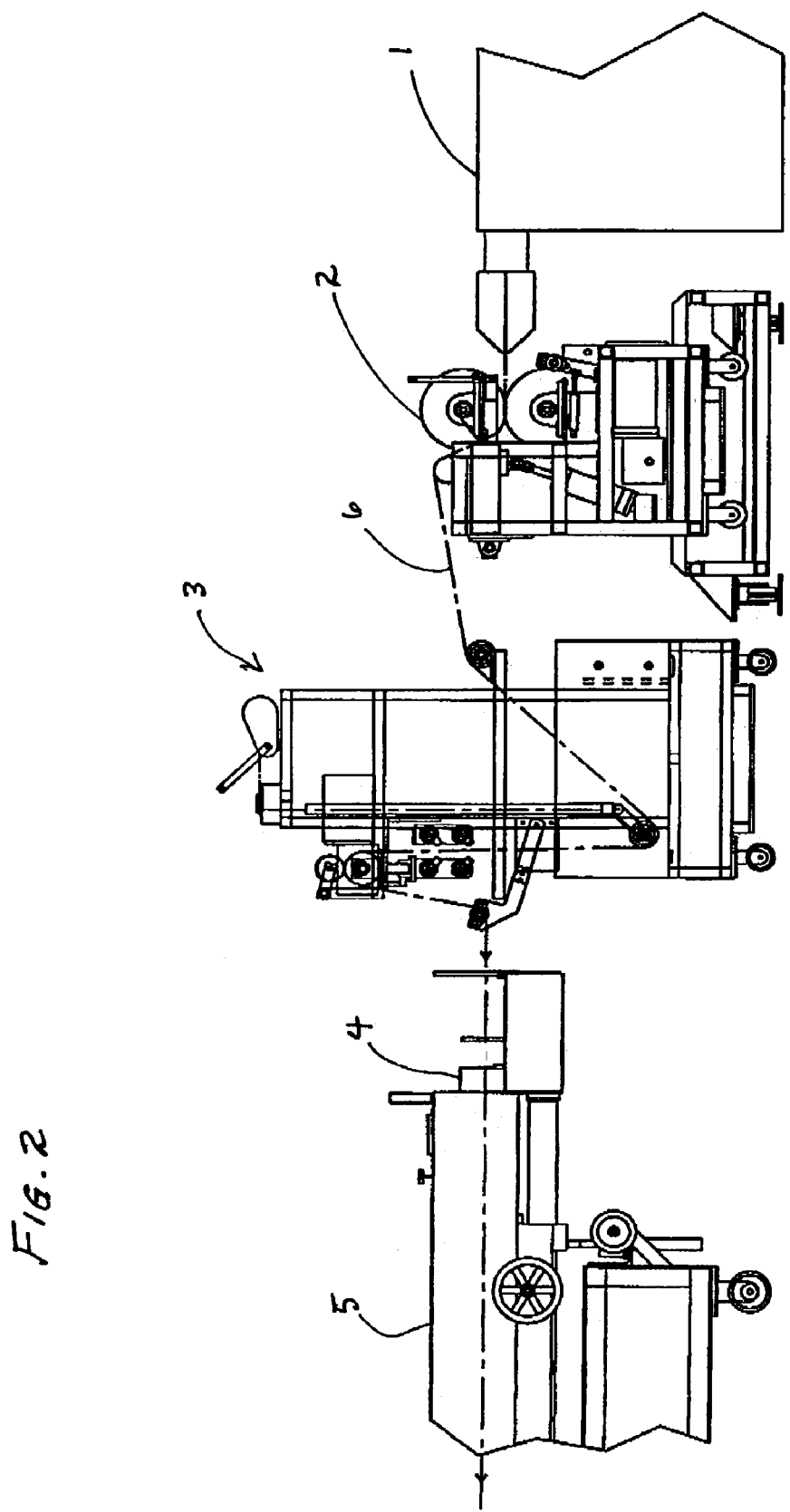
FIG. 2 is a generalized view of a production line for the manufacture of strips of vinyl siding including the present invention.

FIG. 2 generally illustrates a production line for the manufacture of strips of siding, such as vinyl siding, according to the present invention. The production line includes, from right to left, an extruder 1, an embosser 2, the cooling apparatus 3 of the present invention, a forming die 4, and lastly, a final cooling tank 5. The strip of plastic siding 6 runs from right to left through the aforementioned production machines and emerges from the cooling tank 5 as a continuous length wherein it is transversely cut into selected lengths and boxed for shipment. The siding strip 6 is typically 6–15 inches wide by 0.040" thick and includes an upper surface on which a wood grain pattern is embossed by the embosser 2 and a side margin which is formed in the forming die 4 to a attachment or joining run. The joining run configuration is typically an angled side strip suitable for laying flat against the building side and for securing the siding strip 6 to the building so that fasteners are concealed. Additionally, some joining strips are designed for connection to the lower margin side of the next strip on top. Different manufacturers prefer different joining runs of their own selected design shape, and no particular shape is intended in the present disclosure.

Figure 3:
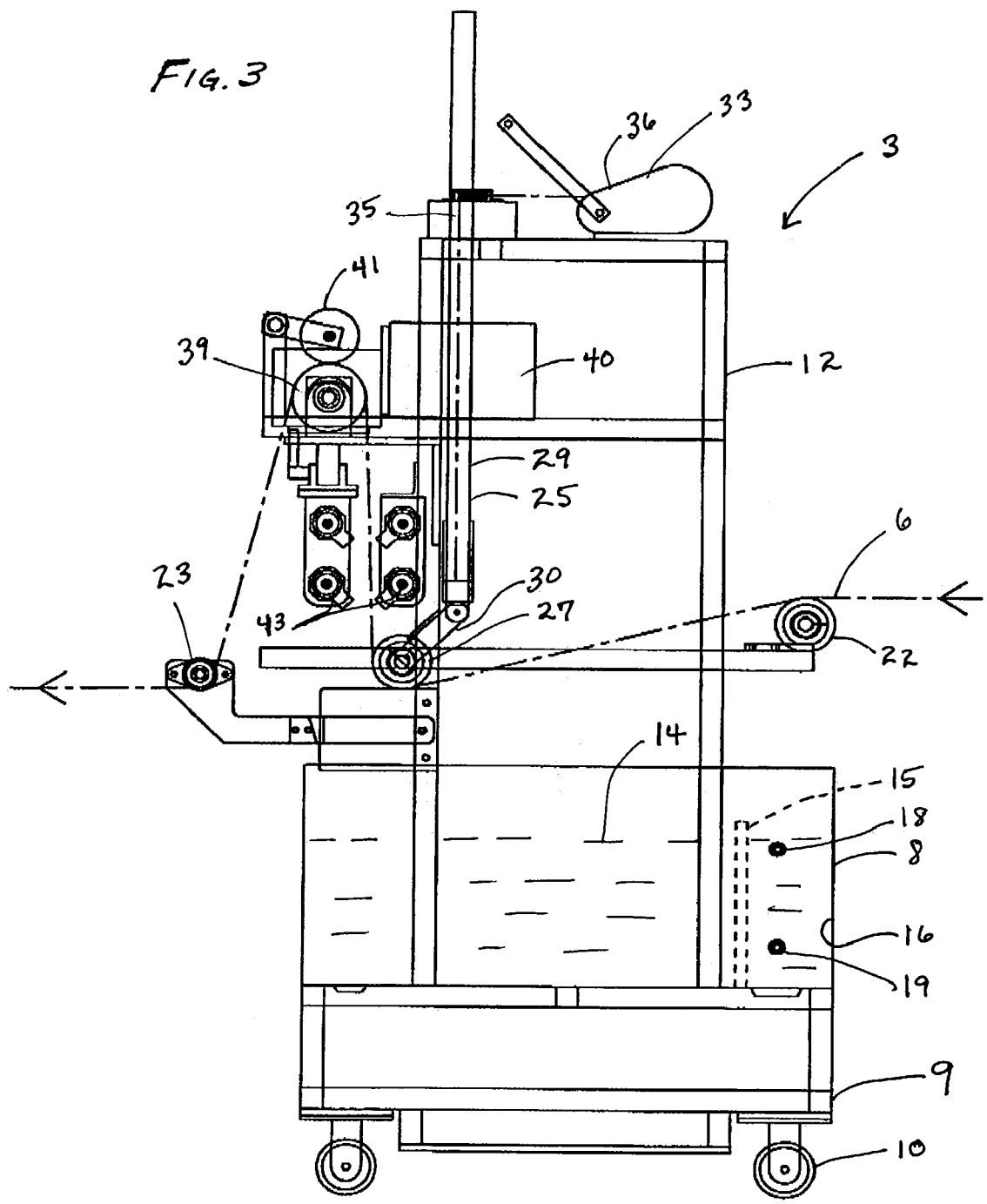
FIG. 3 is a side elevation view of the cooling apparatus of the present invention and showing the height adjustment mechanism raised to a full up position.

FIG. 3 shows the cooling apparatus 3 of the present invention which consists of a water bath tank 8 mounted on a basal support 9 which is moveable over a floor surface, as by wheels 10. An upper framework 12 extends upwardly from the water bath tank 8 and provides a mounting assembly for an array of apparatus components as hereinafter described. A level of coolant 14 is maintained in the water bath tank. The coolant is typically water, although other liquids may be used as desired. An interior baffle 15 separates the main body of the tank 8 from an overfill area 16. High and low quantity sensors 18 and 19 provide shut-off and fill indications to a controller (not shown) to replenish the tank 8. The upper framework 12 first mounts an entry roller 22 which provides a low friction guide for entry of the siding strip 6 into the cooling apparatus 3. Similarly, an exit roller 23 provides exit control and alignment of the siding strip as it travels to the forming dies down line. Both the entry and the exit rollers 22 and 23 are mounted to the upper framework 12 and situated above the water bath tank 8. An adjustable mechanism 25 is mounted to the upper framework 12 and carries at its lower extremity an immersion roller 27. The adjustable mechanism 25 includes a pair of spaced vertical shafts 29, each connected at bottom ends to angle arms 30 with the immersion roller 27 extending and mounted there between. The angle arms 30 position the immersion roller 27 for correct exit of the siding strip 6 in generally a vertical run upwardly from the water bath tank 8 for optimal water shedding. The vertical shafts 29 are supported in appropriate guides (not shown) in the upper framework 12 and raised and lowered via a hoist mechanism 33. Various forms of hoist mechanisms are well known in the art and are interchangeable for moving the immersion roller 27 upwardly and downwardly relative to the water bath tank 8. In the illustrated example, the hoist mechanism is a cable 35 and manual winch assembly 36 which uses the normal winch locking cog to maintain the immersion roller 27 at a selected height. From the immersion roller 27, the siding strip 6 travels upwardly in a generally vertical run to and around a drive roller 39, driven by an electric motor 40. An idler roller 41 against the drive roller 39 maintains appropriate pressure on the siding strip 6. The electric motor 41 is speed variable so as to match the line speed of the siding strip 6 with other drivers. Mounted in the vertical or near vertical run of the siding strip 6 from the immersion roller 27 to the drive roller 39 is an array of blower air nozzles 43 which provide an air knife function to blow excess coolant water off of the strip 6 as it emerges from the water bath tank 8.

FIG. 3 shows the immersion roller 27 in a full up position wherein the siding strip 6 is not run through the water bath tank 8. An operational illustration of the cooling apparatus is shown in connection with FIG. 4 wherein the hoist mechanism 33 is operated so as to lower the immersion roller 27 into a full down position so that the siding strip 6 is at its full downward travel into the water bath tank 8. This full down position allows the longest dwell time of the siding strip 6 within the tank 8. The hoist mechanism 33, when raised, provides progressively less dwell time of the siding strip 6 within the water bath tank 8. The longer the dwell time, the more the temperature of the siding strip 6 is reduced by the cooling apparatus 3. Preferably, a drop of 100° F. from the initial 350° F. temperature of the siding strip 6 as it emerges from the embosser is desired so as to provide the strip 6 at the proper temperature at the forming die 4 for formation of the joining run marginal strip without bunching at the forming die 4 or without cracks or other deformation of the joining run as it leaves the forming die. Additionally, the water firm remaining on the siding strip 6 from immersion in the water bath helps lubricate the strip as it enters the forming dies.

Coolant water in the water bath tank 8 is replenished by action of the high and low sensors 18 and 19, and may be routed through a self-contained recirculation system including a chiller tank with heat exchanger coils and other appropriate temperature regulation systems.

While certain forms of this invention have been illustrated and described herein, the invention is not limited thereto, except insofar as such limitations are included in the following claims.

What is claimed is:

1. A cooling apparatus for receiving a heated polymer strip and immersing the strip in a water bath to lower the temperature of the strip to reduce pliability of the strip and comprising:
   a. a water bath tank;
   b. entry and exit roller for said strip mounted above the level of water in said water bath tank;
   c. an immersion roller positioned between said entry and exit rollers and selectively extendable in depth into said water bath so as to selectively extend said strip deeper into said wafer bath and thereby vary the dwell time of said strip in said water bath to lower the temperature of said strip and reduce pliability of said strip;
   d. a drive roller mounted above said water bath tank and in the line of strip travel between said immersion roller and said exit roller, said drive roller capable of driving said strip through said cooling apparatus and being positioned above said immersion roller so that said strip travels substantially vertically therebetween; and e. air blower units mounted between said immersion roller and said drive roller so as to blow off water clinging to said strip as it exits the water bath.

2. The cooling apparatus set forth in claim 1 wherein said immersion roller is selectively extendable into said water bath via a hoist system.

3. A cooling apparatus for cooling a strip of heated material and comprising:
   a. a water bath tank;
   b. tank entry and exit guides for a strip to be cooled in said tank;
   c. an immersion guide between the entry and exit guides selectively extendable in depth into the water bath tank so as to vary the dwell time of the strip in said water bath tank; and
   d. a drive mounted above the water bath tank and between the immersion guide and the exit guide, the drive capable of driving the strip through the cooling apparatus and being positioned above the immersion guide so that the strip travels substantially vertically therebetween.

* * * * *